Nov. 10, 1931.    H. O. HALL    1,831,303
CUTTER EXPANDER
Filed Jan. 9, 1930    2 Sheets-Sheet 1
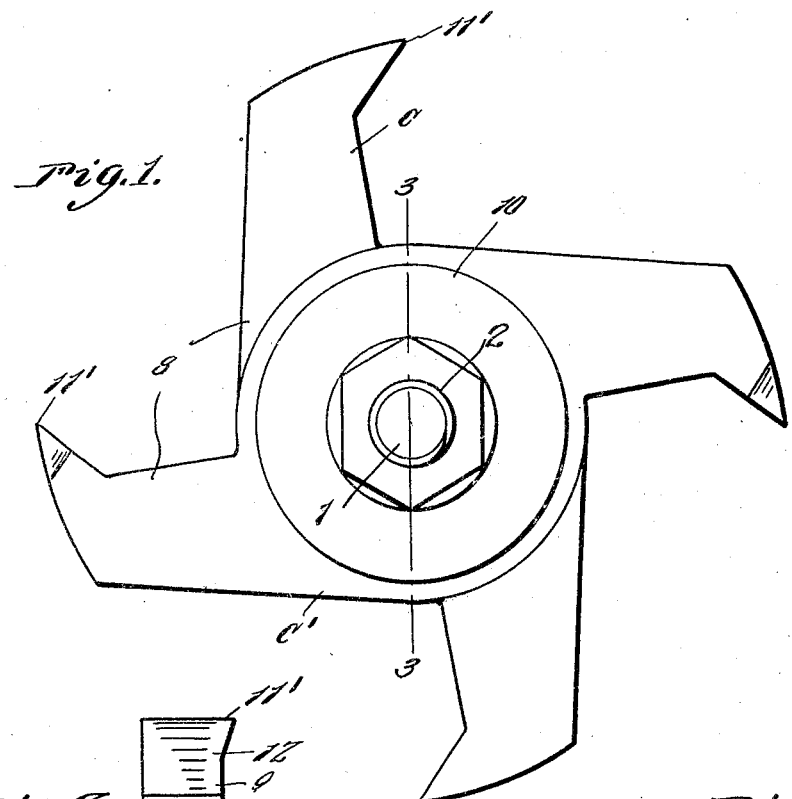
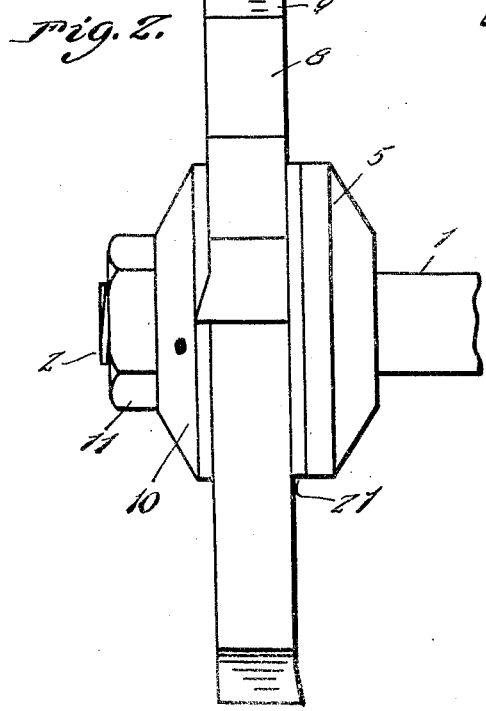
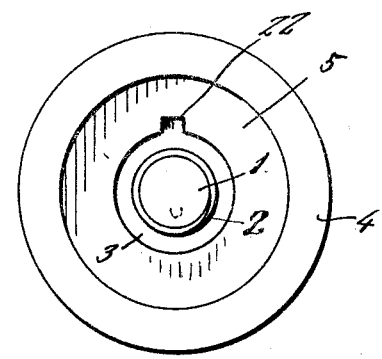
Inventor
*Harry O. Hall*
By *Clarence A. O'Brien*
Attorney Nov. 10, 1931.  H. O. HALL  1,831,303
CUTTER EXPANDER
Filed Jan. 9, 1930   2 Sheets-Sheet 2
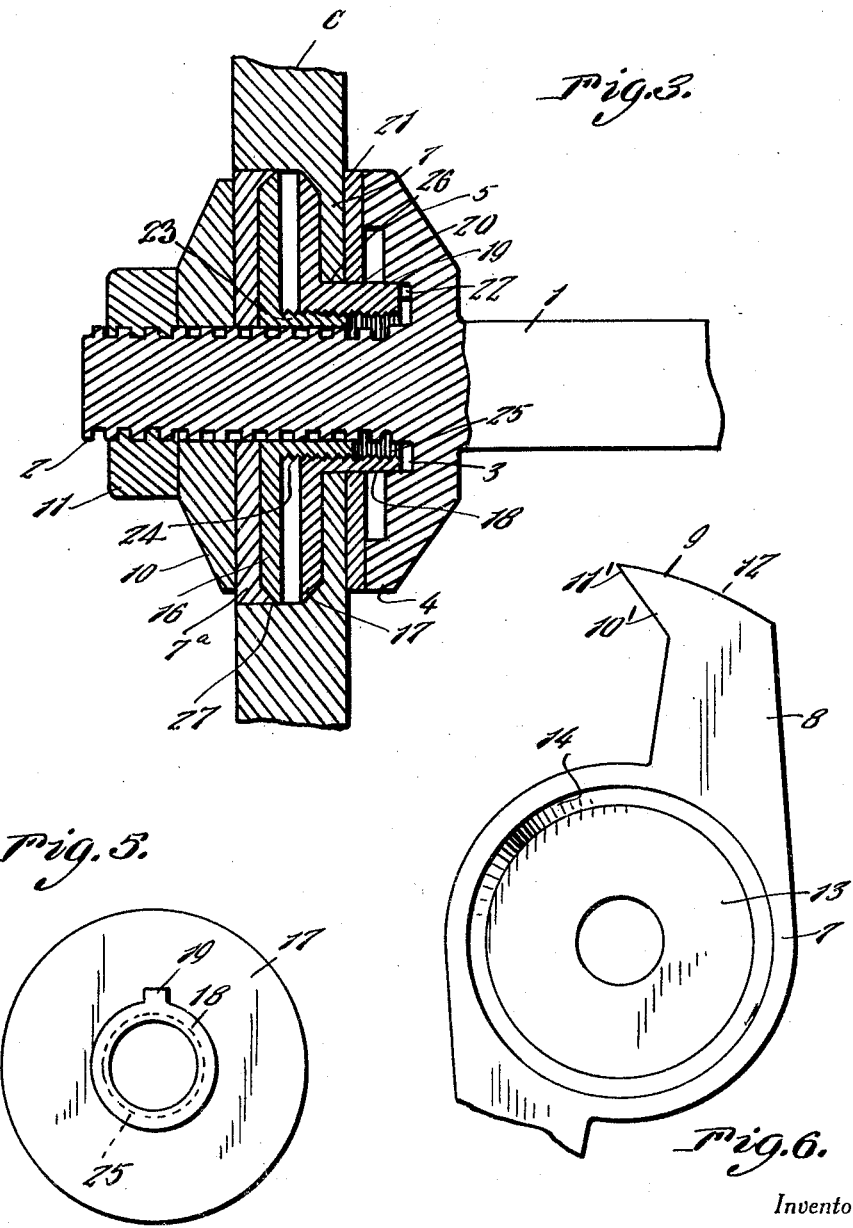
Inventor
Harry O. Hall
By Clarence A. O'Brien
Attorney Patented Nov. 10, 1931

1,831,303

UNITED STATES PATENT OFFICE

HARRY O. HALL, OF SALT LAKE CITY, UTAH

CUTTER EXPANDER

Application filed January 9, 1930. Serial No. 419,685.

This invention relates broadly to cutters, and more particularly to an improved cutting head embodying suitable expanding means whereby the cutters are capable of maximum expansion.

Another very important object of the invention is to provide in a cutter head, certain improvements in expanding devices used in conjunction with cutter heads.

A still further object of the invention is to provide in a device of this character, a cutting head which is simple in construction, comprising comparatively few parts, is capable of the maximum amount of expansion and is thoroughly reliable, practical and efficient in operation.

Other objects and advantages of the invention will become apparent during a study of the following description taken in connection with the drawings wherein:—

Figure 1 is a side elevation of a cutter head embodying the features of the present invention.

Fig. 2 is an edge elevation thereof.

Fig. 3 is a longitudinal fragmentary detail sectional view through the cutter head.

Fig. 4 is an end view of the mandrel.

Fig. 5 is a face view of one of the expander disks.

Fig. 6 is a fragmentary detail elevation of one of the cutters.

Referring more in detail to the drawings, it will be seen that I have designated the mandrel by the reference character 1. The outer or working end of the mandrel for a predetermined length thereof is threaded as at 2. Inwardly of the threaded portion 2 of the mandrel, said mandrel is equipped with an annular shoulder or collar 5, the same being provided with an outstanding peripheral flange 4. The shoulder or collar 5 is also provided on the outer face thereof with an annular groove or pocket 3 circumjacent the mandrel 1.

A loose collar 10 and screw threaded nut 11 are adapted to retain the cutters in position between the loose collar 10 and the stationary or fixed collar 5. The cutters are substantially identical in construction, and each of the said cutters, comprises a body or disk-like hub portion 7 from diametrically opposite sides of which extend arms 8, which arms 8 terminate in oppositely extending teeth 9 formed with rearwardly inclined front faces 9', front cutting edges 10', and rearwardly curving top or rear faces 12.

On their inner opposed faces, the hub-like portions 7 of the cutters, are recessed as at 13, the peripheral wall of the recess being beveled as at 14. The cutters are mounted on the threaded portion 2 of the mandrel 1 with their recessed faces in opposed relation, as shown to advantage in Fig. 3, and with the arms of the cutters extending in an annular series as shown to advantage in Fig. 1.

The invention further comprehends a pair of expander disks 16 and 17. The expander disk 17 is provided with a central hub or sleeve 18 projecting from one side thereof, and the hub or sleeve 18 extends through the hub portion 7 of the inner one of the cutters or that cutter nearest the stationary collar 5, the end of the hub or sleeve 18 being receivable in the annular recess or groove 3 of said collar 5.

On its exterior, the hub or sleeve 18 is provided with a key member 19 receivable in a notch or keyway 20 formed on the inner edge of an annular disk or washer plate 21, said washer plate being disposed between the flange 4 and the face of the adjacent cutter member as shown to advantage in Fig. 3.

Communicating with the recess 3 and formed on the collar 5 is a keyway 22 in registry with the keyway 20 on the washer plate or disk 21 for the reception of the inner end of the key 19. The said expander disk 17 is seated within the recess formed in the hub portion 7 of the cutter nearest the stationary collar 5 and the expander disk 16 is receivable in the recess in the other or outer one of said cutters, and this expander disk 16 is also provided with a hub or sleeve extending from one face thereof, as at 23. The hub 23 of the expander disk 16 is externally threaded as at 24 for engagement with the internal thread 25 of the sleeve or hub 18 of the said expander disk 17.

The cutter nearest to the stationary collar 5 for the sake of clarity will be designated generally by the reference character C and the other or outer one of said cutters by the reference character C'. The cutter C is also cut to provide a keyway 26 for engagement with the said key member 19 on the hub 18.

At their peripheral edges, the expander disks 16 and 17 are beveled as at 27 corresponding to the beveled walls 14 of the recesses 13 of said cutter members.

The manner of adjusting the cutters through the medium of such expansion means is as follows:—

The cutter C, washer 21, and expander disk 17, through such key means as hereinbefore described in detail, being fixed with respect to the spindle 1, by rotating the expander disk 16 for threading the hub 23 thereof into the hub 18 of the expander disk 17, the cutter C' may be moved inwardly toward the cutter C to any desired predetermined position, while by rotating the expander disk 16 in the opposite direction, the cutter C' will be retained in any predetermined adjusted position away from the cutter C.

Thus by rotating the expander disk 16, any predetermined adjustment between the said cutters is possible. Of course, as is apparent, if a right hand thread is used on the end of the mandrel 1, a left hand thread is used on the expander. This makes a solid lock. The result is, that pressure is applied on both sides of the outside cutter holding the outside cutter in an adjusted position.

It will also be appreciated that through the medium of such an expander, the cutters may be extended the desired width without or with the necessity of removing the cutters.

It is believed that from the foregoing, taken in connection with the accompanying drawings, a clear understanding of the operation, construction, features and advantages of a device of this character will be had by those skilled in this art, without a more detailed description.

I do not wish to limit myself to the specific type of cutters, since an expander of this character may be used with other types of cutters, used in substantially the same manner.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:—

1. A rotary cutter comprising in combination, a spindle, a pair of cutter members arranged on said spindle for rotation therewith, each of said cutter members provided with a recess, an expander disk arranged in the recess of each of said cutter members, each of said expander disks provided with an integral sleeve, means for keying the sleeve of one expander disk to its cutter member, the sleeve of said one expander disk being internally threaded, and the sleeve of the other expander disk being externally threaded for engagement with the threads of the first mentioned sleeve.

2. A rotary cutter head including in combination a spindle, said spindle inwardly from one end thereof provided with a collar, said collar provided with a recess concentrically of said spindle, a loose collar on said one end of said spindle, a pair of cutter members mounted on said spindle between said collars, means axially adjustable on said spindle and engageable with said loose collar for urging the same toward the first mentioned collar for clamping said cutter members on said spindle, a pair of expander disks arranged on said spindle between said cutter members, each expander disk of said pair provided with a sleeve, one of said sleeves being internally threaded, and the other of said sleeves being externally threaded for threaded engagement with said one sleeve, and said one sleeve extending through an aperture provided in one of said cutter members and having its free end received in said recess, and means for keying said one sleeve to said one cutter member and to said first mentioned collar.

In testimony whereof I affix my signature.

HARRY O. HALL.